United States Patent
Bachle et al.

[11] 3,794,360
[45] Feb. 26, 1974

[54] EXTERNAL SWAGE END FITTING

[75] Inventors: Wilfred H. Bachle, Long Beach; Gilbert Segovia, Santa Ana; H. Andre Parker-Jones, Newport Beach, all of Calif.

[73] Assignee: Philco-Ford Corporation, Philadelphia, Pa.

[22] Filed: Nov. 1, 1971

[21] Appl. No.: 194,123

[52] U.S. Cl................. 285/256, 285/174, 285/259, 285/367
[51] Int. Cl............................................. F16l 33/20
[58] Field of Search... 285/256, 149, 249, 248, 259, 285/174, 367

[56] References Cited
UNITED STATES PATENTS

| | | | |
|---|---|---|---|
| 2,888,277 | 5/1959 | Melsom | 285/149 |
| 2,384,635 | 9/1945 | Melsom | 285/256 X |
| 1,778,244 | 10/1930 | Cadden | 285/256 X |
| 2,250,286 | 7/1941 | White | 285/256 |
| 2,430,921 | 11/1947 | Edelmann | 285/259 X |

FOREIGN PATENTS OR APPLICATIONS

| | | | |
|---|---|---|---|
| 680,110 | 10/1952 | Great Britain | 285/256 |
| 875,502 | 8/1961 | Great Britain | 285/149 |
| 373,609 | 1/1964 | Switzerland | 285/256 |

*Primary Examiner*—Thomas F. Callaghan
*Attorney, Agent, or Firm*—William E. Johnson; Keith L. Zerschling

[57] ABSTRACT

This invention describes a unique externally swaged end fitting for a single or multi-layer, braid-covered cast membrane tube of the type used in fluid filtration systems. It can be used as a coupling between dissimilar tubing or two tubes of like characteristics.

1 Claim, 9 Drawing Figures

EXTERNAL SWAGE END FITTING

BACKGROUND OF THE INVENTION

In fluid filtration plants it is customary to employ tubular as well as sheet and fine hollow fiber membranes as the filtration means. Tubular membranes are typically made by casting a length of permeable tube consisting of, for example, cellulose acetate. Because there is very little mechanical strength in such tubing it will not stand the operating conditions of water purification systems, particularly relatively high hydraulic pressures, and for this reason the tubing is commonly encased or reinforced in a varity of ways. This invention is directed to the tubular end and coupling fittings specially adapted for use with multi-layer braided reinforcement and the membrane tube therein.

With the end fittings presently available, difficulties have been experienced, the most common causes of failure being a rupture of the membrane tube at the point at which the membrane support is transferred from the braided covering to the metal fitting when subjected to internal hydraulic pressure. These failures are difficult to prevent when braided reinforcement is used, one reason being a lack of adhesion between the cast tube and the braid, another being a severe loss of braiding strength when the end is flared to accommodate a small angle tapered type fitting due to the inevitable spreading apart of the weave or braid thereby weakening the reinforcing effect of the braid and leaving the cast tube locally unsupported and vulnerable to mechanical failure.

A cellulose acetate membrane, for example, is thin and fragile. Its thickness can vary from 4 to 12 mils and it must be maintained in a wet state during its fabrication and integration with its pressure support.

The membrane for which the present invention is intended is supported by a braided covering of polyester fibers with no resin binder. This braided covering is flexible and can support no shear forces. A cut end will tend to unravel or come apart if handled before it is captured by the end fitting.

In addition, the membrane is susceptible to damage by most solvents used in elastomeric sealants or resin systems; thus, sealing and structural strength must be achieved by mechanical means only. Additionally, in some applications the product water is intended for human consumption. This dictates that the materials used must not contaminate the product water and must satisfy the FDA requirements.

The end fitting must seal and maintain structural integrity at fluid pressures of up to 1,500 psig. Even higher pressure containment is useful in some applications.

Early laboratory end fitting concepts provided a separate structural attachment to the braided covering in which the braid was clamped between a male and female part of the end fitting. The membrane was passed through the end fitting and a fluid seal was achieved at some point other than the point at which the structural joint between the end fitting and the braid was made. This end fitting concept proved to operate successfully when used on small diameter membranes; i.e., diameters of approximately a quarter inch. It did not lend itself to successful use with one inch diameter membranes for the following reasons:

a. It is necessary with many of the fittings now available to loosen the weave of the braid to provide the required flare at the end of the braided sheath to allow insertion of the male part of the end fitting. Because of the larger number of braid yarns per inch and the increased number of yarn cross-over points, this flaring cannot be uniformly accomplished in the larger sizes to the degree necessary without destroying the structural coherence of the braid.

b. A small unsupported circumferential area of membrane occurs at the point at which the membrane support is transferred from the flexible braid to the end fitting. This is due to the finite thickness required in the wall of the end fitting in order that it be amenable to fabrication processes. This area of nonsupport or inadequate support allows excessive elongation of the membrane under pressure resulting in degraded performance and a high probability of rupture; also, the assembly process for this laboratory type end fitting is time consuming and requires a high level of skill in the person performing the assembly. Neither of these facts is compatible with the production requirements for rapid and reliable assembly with relatively unskilled labor. Therefore, the development of an end fitting usable with a braid supported tubular membrane for use in a reverse osmosis system involves the solution of the above stated problems.

SUMMARY OF THE INVENTION

To eliminate such problems as these discussed above a new and unique end fitting for use as a coupling between a single or multi-layer braided membrane tube and an orthodox metal or plastic tube has been invented. As will be more fully described below, a braid reinforced membrane tube is securely clamped in a unique manner by externally swaging (shrinking) an outer sleeve onto an assembled tube and interior members such that the effectiveness of the braiding is not impaired, the fragile tube therein is continually supported and the possibility of axial movement — or pullout — of the tube from the fitting is eliminated.

It is the object of the present invention, therefore, to provide an end fitting suitable for leakproof use with a braid covered tube where the tube itself has very little mechanical strength.

A further object of the invention is to provide a leakproof coupling means without the use of elastomeric sealants or the like.

Another object of this invention is to provide an end fitting, the parts of which can be mass produced by well known methods on orthodox equipment.

It is yet another object of the invention to provide an end fitting which requires no high degree of skill to achieve a satisfactory assembly.

DESCRIPTION OF A PREFERRED EMBODIMENT

Figure 2:
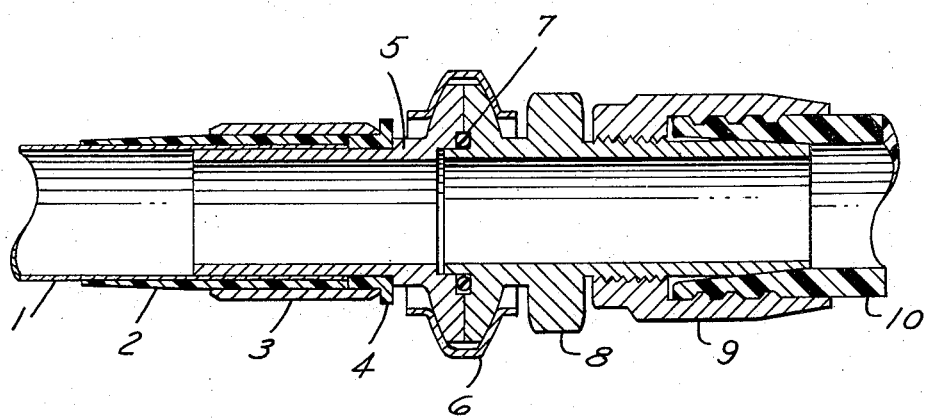
FIG. 2 is a sectional view of an assembled end fitting sectioned parallel with the main axis of the fitting.
Figure 3:
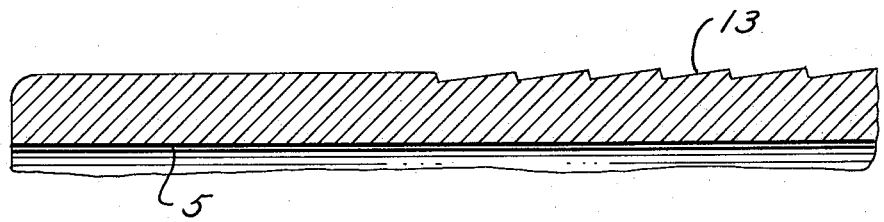
FIG. 3 is a greatly enlarged part-section of 5 illustrating the serrations 13.

With reference now to FIG. 2 and a method of assembling the membrane tube into the end fitting 5. It should first be noted that that part of the outer diameter of the end fitting 5 which is to be inserted into the membrane tube 1 is specially prepared by grooving and hydro-honing. The grooving of 5 is shown at 13 in FIG. 3 and it has been discovered that the sawtooth form of the grooves which are approximately 8 mils deep, is most effective in assisting the gripping of the membrane tube if they are cut to an angle of approximately 73° with respect to the axis of the fitting. It will be immediately apparent that the subsequent hydro-honing will remove the sharp edges at the apexes of the sawtooth forms. Hydro-honing is known in the art as a process similar to sand blasting and is a process in which glass beads are carried in a jet of water which, when directed at the part, leave a finely abraided surface.

A plastic sleeve 2 FIG. 2 (which can be a polycarbonate) is first slipped over the braided membrane tube, over that is placed the metal compression sleeve 3 FIG. 2 which at this stage of the assembly is so internally dimensioned as to provide a slip fit onto the plastic sleeve 2.

An end fitting 5 is next inserted into the braided membrane tube 1 and by using orthodox swaging means the metal compression sleeve 3 is closed tightly about the plastic sleeve 2 thereby sealing the membrane tube 1 to the end fitting 5 and locking the braided covering over the sawtooth serrations 13 by deformation of the plastic sleeve 2. It should be noted that the plastic ring 4 is pressed onto the metal end fitting 5 to provide a material with the same characteristics as the plastic sleeve 2. This is important so that the metal compression sleeve can be uniformly swaged over the braid covered membrane 1 and the metal end fitting 5 effectively joining the two structurally. If the ring 4 were not provided, the compression sleeve would either not grip the fitting 5 or would come to rest on the rigid metal fitting limiting the swage. This in turn would result in a poor or loose grip between the braid covered membrane 1, the sleeve 2, and the end fitting 5.

Considering now the cooperating part of the fitting which is comprised of an end fitting 8 FIG. 2, the external diameter of which is tapered to receive a rubber or plastic hose 10 and threaded to receive the hose clamping nut 9.

As this part of the fitting is considered to be within the state of the art no further detailed explanation will be given and it will readily be seen that the novel part of the fitting first described can be adapted to connection with many orthodox fittings by variations in the tube receiving end of the end fitting 8.

To effect a leakproof connection between the end fittings 5 and 8 an "O" ring 7 is placed in a suitable cavity half of which is in 5 and the other half in 8.

Figure 1:
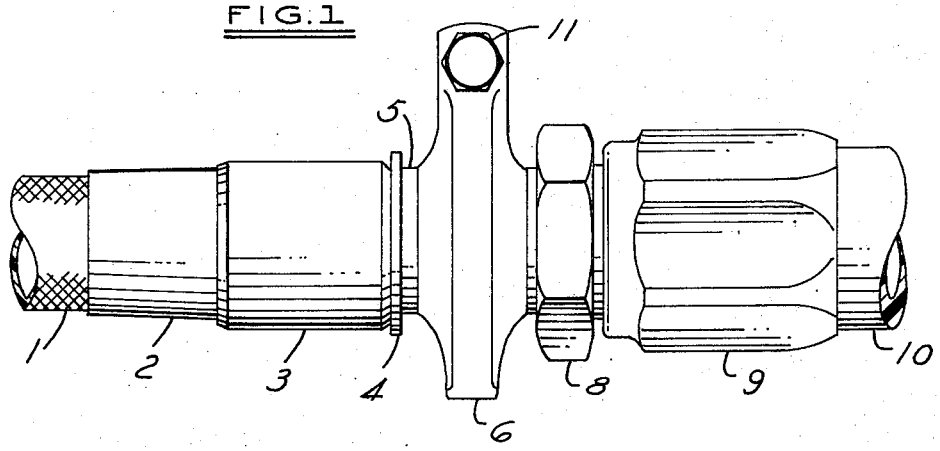
FIG. 1 shows an assembled fitting.

Tightening of the clamping bolt 11 FIG. 1 will now cam the two end fittings together by virtue of the internal angles on the vee-band clamp 6 in cooperation with the angular faces of the flanges on the end fittings 5 and 8 and a mechanically strong and leakproof coupling is provided.

Figure 4:
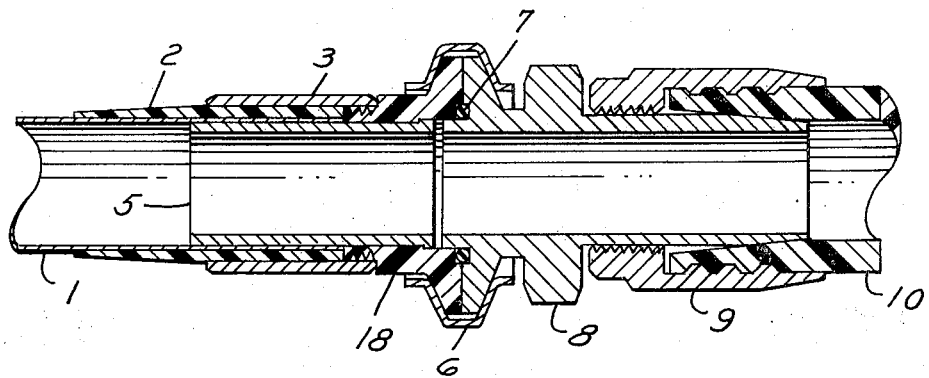
FIG. 4 is a sectional view of an alernative arrangement utilizing a plastic end fitting 18 instead of metal as in 5 FIG. 2.
Figure 5:
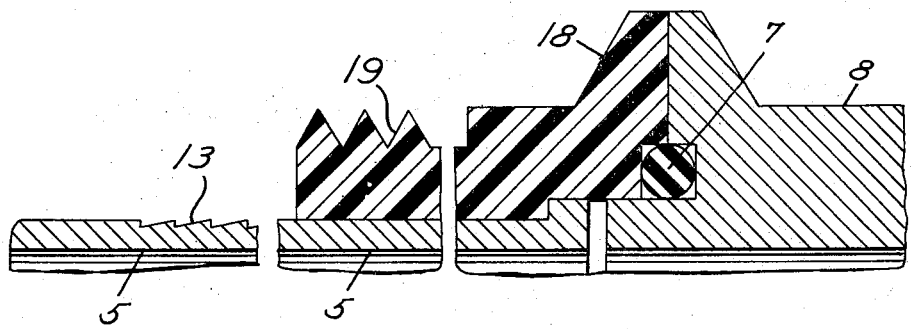
FIG. 5 is a part sectional view of the plastic end fitting 18 and shows in greatly exaggerated size the method of grooving 19 to allow plastic flow of the plastic sleeve 2 FIG. 2 in response to the swaging pressure of the collar 3 FIG. 1 and 2.

A modification of the foregoing embodiment is shown in FIG. 4 where the steel end fitting 5 of FIG. 2, is replaced by a plastic end fitting 18. FIG. 5 is an enlarged part-sectional view of 18, a feature of which is the relief by means of annular grooves 19 to allow plastic deformation to occur when subjected to the swaging of the metal compression ring 3. This ensures that the swaging process is not limited by the fitting 18, yet grips it securely.

Figure 7:
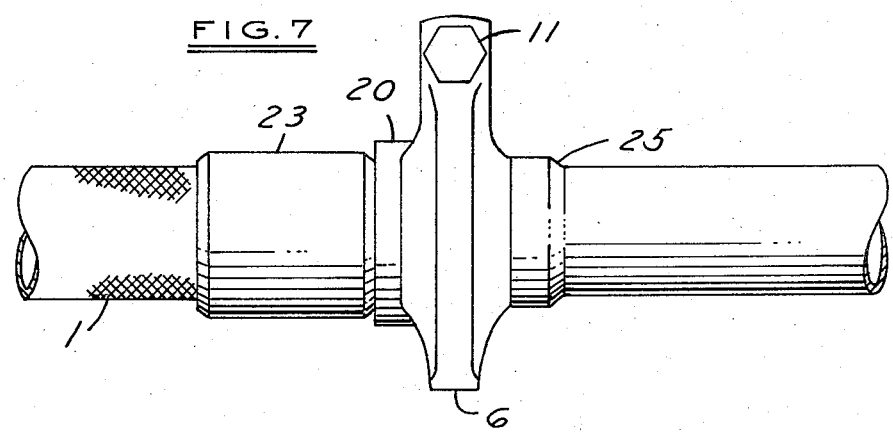
FIG. 7 is an illustration of an assembled end fitting modified to provide higher strength and to couple a braided membrane tube to a metal or plastic tube.
Figure 8:
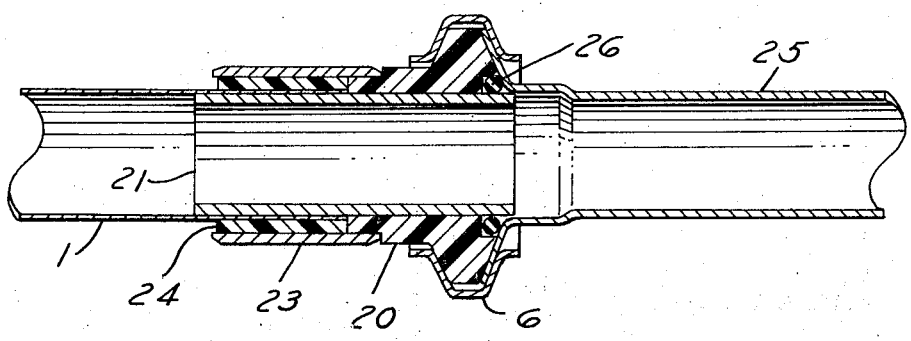
FIG. 8 is a sectional view of FIG. 7 showing the angular flared sealing surface of a metal or plastic tube and its cooperating part 20 FIG. 8.

It has been found that where maximum strength is required, as for instance in cases where very high internal pressures are used, that the embodiment shown in FIG. 7 and 8 is to be preferred.

Figure 9:
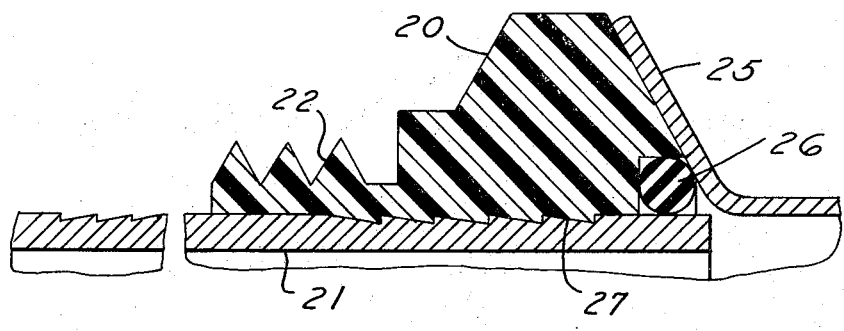
FIG. 9 is an exaggerated section of 20 FIG. 8 showing the serrations 27 and the annular grooves 22.

Reference to FIG. 9 will show that the internal diameter of end fitting 20 is grooved in the form of annular serrations 27 to afford a stronger structural grip on the external diameter of an inner sleeve 21. As will best be seen in FIG. 8, the braided membrane tube is slipped part way over the inner sleeve 21 and is securely clamped thereto by compression of the swaging ring 23 acting through the plastic sleeve 24.

As an example a metal or plastic tube 25 is shown with an angular flared end, the angle of the flare corresponding to the angle of the end fitting 20 and secured thereto in leakproof engagement by means of the vee-band clamp 26. Such clamps are well known in the art and are frequently used in this manner. An elastomeric "O" ring can be installed as shown at 26 in FIGS. 8 and 9 to provide a seal against possible leakage.

Figure 6:
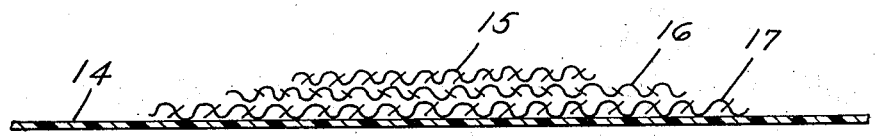
FIG. 6 is illustrative of a part section of multilayer braided membrane tube as typically used in reverse osmosis fluid separation systems.

The tube as shown in FIG. 6 has a cellulose acetate membrane 14 and is supported by a multi-layer braided reinforcement 15, 16 and 17.

While preferred embodiments of this invention have been disclosed, as for instance its adaptability for use with membrane tubing and to its use in fluid purification systems, it will be readily understood that other embodiments and uses are possible without departing from the inventive concept and that those skilled in this particular art will have no difficulty in envisioning other and different configurations within the scope of this invention. We therefore desire our invention to be limited only by the claims hereunder.

We claim:

1. An end fitting for a delicate reverse osmosis membrane of tubular configuration, which end fitting comprises:

an inner sleeve (21) of generally cylindrical configuration having a front end and a back end, said internal sleeve having serrations extending along a portion of its outer surface at both ends thereof;

an end fitting (20) of generally cylindrical construction having an internal surface swaged against at least a portion of said serrations of said surface at said front end of said internal sleeve, said end fitting having an outer, external surface area having a plurality of serrations (22) thereon, said end fitting having structure thereon permitting it to be coupled to exterior piping;

a delicate reverse osmosis membrane and membrane supporting structure (1) of cylindrical construction extending along a substantial portion of said outer surface of said inner sleeve and engaging at least a portion of said inner sleeve's serrations;

a plastic sleeve (24) exterior of said reverse osmosis membrane and membrane supporting structure and in a close confining relationship thereto, said plastic sleeve being positioned to encircle a portion of said outer surface of said internal sleeve; and a compression sleeve (23) encircling both said plastic sleeve and said plurality of serrations on said external surface of said end fitting, said compression sleeve being swaged against said plastic sleeve and said plurality of serrations on said end fitting so that said reverse osmosis membrane and membrane supporting structure and said plastic sleeve are uniformly and tightly positioned against said inner sleeve and said end fitting is gripped tightly between said compression sleeve and said inner sleeve thereby to form a water tight seal.

* * * * *